(No Model.)
J. R. PAYNE.
SLIDING GATE.
No. 488,481.  Patented Dec. 20, 1892.
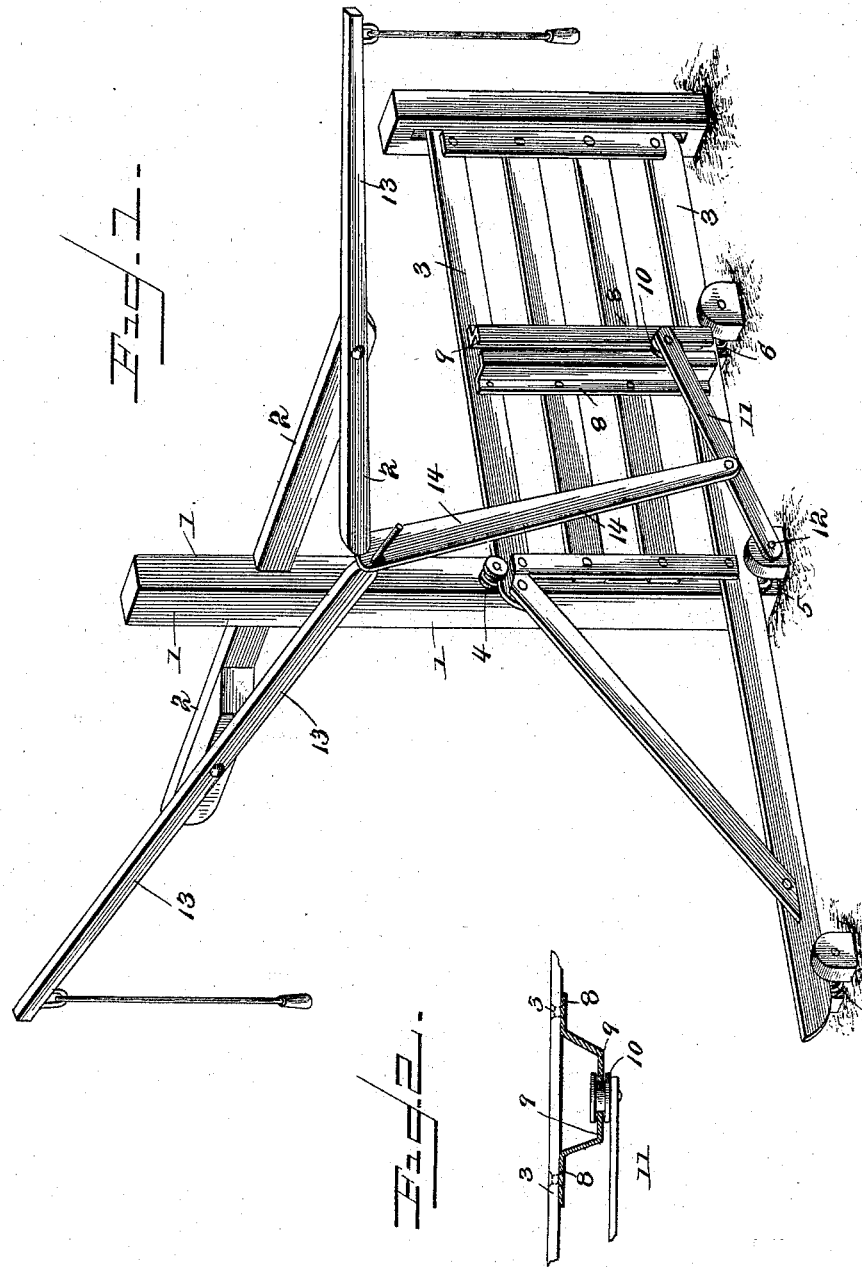

United States Patent Office.

JOHN R. PAYNE, OF FREEDOM, INDIANA, ASSIGNOR OF ONE-HALF TO GEORGE W. JEAN, OF SAME PLACE.

SLIDING GATE.

SPECIFICATION forming part of Letters Patent No. 488,481, dated December 20, 1892.

Application filed September 10, 1892. Serial No. 445,506. (No model.)

*To all whom it may concern:*

Be it known that I, JOHN R. PAYNE, a citizen of the United States, residing at Freedom, in the county of Owen and State of Indiana, have invented a new and useful Sliding Gate, of which the following is a specification.

The invention relates to improvements in sliding gates.

The object of the present invention is to improve the construction of sliding gates and to enable the same to be readily opened and closed from either side of them without necessitating dismounting or leaving a vehicle.

The invention consists in the novel combination and arrangement of parts hereinafter fully described illustrated in the accompanying drawings and pointed out in the claim hereto appended.

In the drawings,—Figure 1 is a perspective view of a gate constructed in accordance with this invention. Fig. 2 is a detail sectional view of the vertical ways of the gate.

Like numerals of reference designate corresponding parts in all the figures of the drawings.

1 designates an upright provided at its top with arms 2 extending from opposite sides of a gate 3, which is mounted on upper and lower rollers 4 and 5, of the upright and on bottom rollers 6 and 7 arranged a suitable distance from the upright and supporting the gate when open and closed and enabling it to slide freely. The rollers are grooved and the gate has its bottom bar extended rearward and connected with the top of the gate by an inclined brace forming a rearward extension and has near its middle vertical plates 8 arranged parallel with each other and provided at their opposed edges with L shaped flanges 9 extending from the gate and forming vertical ways and having arranged between their adjacent edges a grooved roller 10. The grooved roller works vertically between the flanges of the plates and is maintained by them out of contact with the gate so that there is no friction; and the said grooved roller is mounted on the outer end of an oscillating arm 11 which is pivoted at its inner or lower end by the pivot 12 which also serves as a pivot for the lower roller 5 of the upright 1.

Operating levers 13 extend from the gate in opposite directions and are fulcrumed intermediately on the ends of the horizontal arms of the upright and have their inner adjacent ends connected with the upper end of a bar 14 which has its lower end pivoted to the oscillating bar or lever 11 at a point between the ends of the same, whereby when one of the levers is pulled quickly downward, the oscillating bar or lever will be raised. The pull should be sudden and sufficiently hard to carry the oscillating bar or lever past a vertical position to carry the gate past the dead center, when by raising the lever, the gate is fully opened or closed.

It will be seen that the gate is simple and comparatively inexpensive in construction and that it may be readily opened and closed without friction, and that the improvements herein shown and described are applicable to various kinds of sliding gates.

What I claim is;—

The combination of an upright having a horizontal arm extending from it in opposite directions; upper and lower rollers mounted on the upright and having circumferential grooves; the grooved lower rollers 6 and 7; the sliding gate mounted on the lower rollers and received in the groove of the upper roller, and having a rearward extension; the vertical plates secured on the gate and arranged parallel with each other and provided with opposite L-shaped flanges extending out from the gate and forming vertical ways; an oscillating lever having its lower end fulcrumed on the pivot of the lower roller of the upright and provided at its other end with a grooved roller arranged in said ways and receiving the edges of the L-shaped flanges in its groove, the operating levers fulcrumed on the ends of said arm, and the connecting bar connecting the inner ends of the operating levers with the oscillating lever, substantially as described.

In testimony that I claim the foregoing as my own I have hereto affixed my signature in the presence of two witnesses.

JOHN R. PAYNE.

Witnesses:
   JOHN W. WATTS,
   ELMORE HAUSER.